US009124855B2

(12) United States Patent
Glen

(10) Patent No.: US 9,124,855 B2
(45) Date of Patent: Sep. 1, 2015

(54) METHOD AND APPARATUS FOR VIDEO STREAM PROCESSING

(71) Applicant: ATI Technologies ULC, Markham (CA)

(72) Inventor: David I. J. Glen, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 0 days.

(21) Appl. No.: 13/687,415

(22) Filed: Nov. 28, 2012

(65) Prior Publication Data

US 2014/0037265 A1     Feb. 6, 2014

Related U.S. Application Data

(60) Provisional application No. 61/677,568, filed on Jul. 31, 2012.

(51) Int. Cl.
*H04N 9/79*     (2006.01)
*H04N 5/76*     (2006.01)
*H04N 5/765*     (2006.01)

(52) U.S. Cl.
CPC . *H04N 9/79* (2013.01); *H04N 5/76* (2013.01); *H04N 5/765* (2013.01)

(58) Field of Classification Search
None
See application file for complete search history.

(56) References Cited

U.S. PATENT DOCUMENTS

| 6,266,480 | B1 * | 7/2001 | Ezaki et al. | 386/254 |
| 6,999,056 | B1 * | 2/2006 | Kim et al. | 345/99 |
| 7,844,830 | B2 * | 11/2010 | Saito | 713/189 |
| 8,065,707 | B1 * | 11/2011 | Matic et al. | 725/80 |
| 2003/0212995 | A1 * | 11/2003 | Kitamori | 725/41 |

* cited by examiner

*Primary Examiner* — Huy T Nguyen
(74) *Attorney, Agent, or Firm* — Volpe and Koenig, P.C.

(57) ABSTRACT

A method and apparatus for video stream processing is implemented in a monitor scaler chip (MSC). The MSC receives the video stream and determines whether the video stream includes copy protected content. The MSC routes the video stream based upon the determination.

13 Claims, 2 Drawing Sheets

METHOD AND APPARATUS FOR VIDEO STREAM PROCESSING

CROSS REFERENCE TO RELATED APPLICATION

This application claims the benefit of U.S. provisional application No. 61/677,568 filed Jul. 31, 2012, the contents of which are hereby incorporated by reference as if fully set forth herein.

FIELD OF THE INVENTION

The present invention is generally directed to video display, and in particular, to video display and capture.

BACKGROUND

Modern computers are equipped with multiple display ports, (e.g., HDMI or DisplayPort ports), where video may be input to, or output from, the computer, such as an "All-in-One (AiO)" computer. Depending on the source of the video data, a user may either desire that the video data input be immediately displayed on a display screen or saved on the computer for later processing. That is, in some cases, a user may desire the computer system to act merely as a monitor for an external image source device such as a game console or Blu-ray player.

However, in other cases, a user may desire to have the computer capture and record the input from the external video source. For example, a camcorder with an HDMI output may be captured and recorded, such as for future home video editing. Similarly, a user may desire to capture and record a gaming performance or create a "video walkthrough" of a game to help others win the game.

An issue, however, with allowing a computer to capture and record an input from an external video source is that copyright protected content, such as that protected by an HDCP license, may not be copied or recorded. This type of content needs to be only displayed on the display device, without the ability to record or copy it.

It would therefore be beneficial to provide a mechanism to allow non-protected video content to be externally input into a computer for displaying, copying and/or recording, while allowing protected content to only be displayed.

SUMMARY OF EMBODIMENTS

A method and apparatus for video stream processing is implemented in a monitor scaler chip (MSC). The MSC receives the video stream and determines whether the video stream includes copy protected content. The MSC routes the video stream based upon the determination.

BRIEF DESCRIPTION OF THE DRAWINGS

A more detailed understanding may be had from the following description, given by way of example in conjunction with the accompanying drawings wherein.

DETAILED DESCRIPTION

Content input through an external display port, (e.g., HDMI, DisplayPort, and the like), of a computer is routed to a scaler/multiplexer. If the content is protected, such as HDCP protected, the scaler/multiplexer allows the content to be routed only to a display authorized under HDCP rules. If the content is not protected, the content may be routed to the internal computer system for processing.

Figure 1:
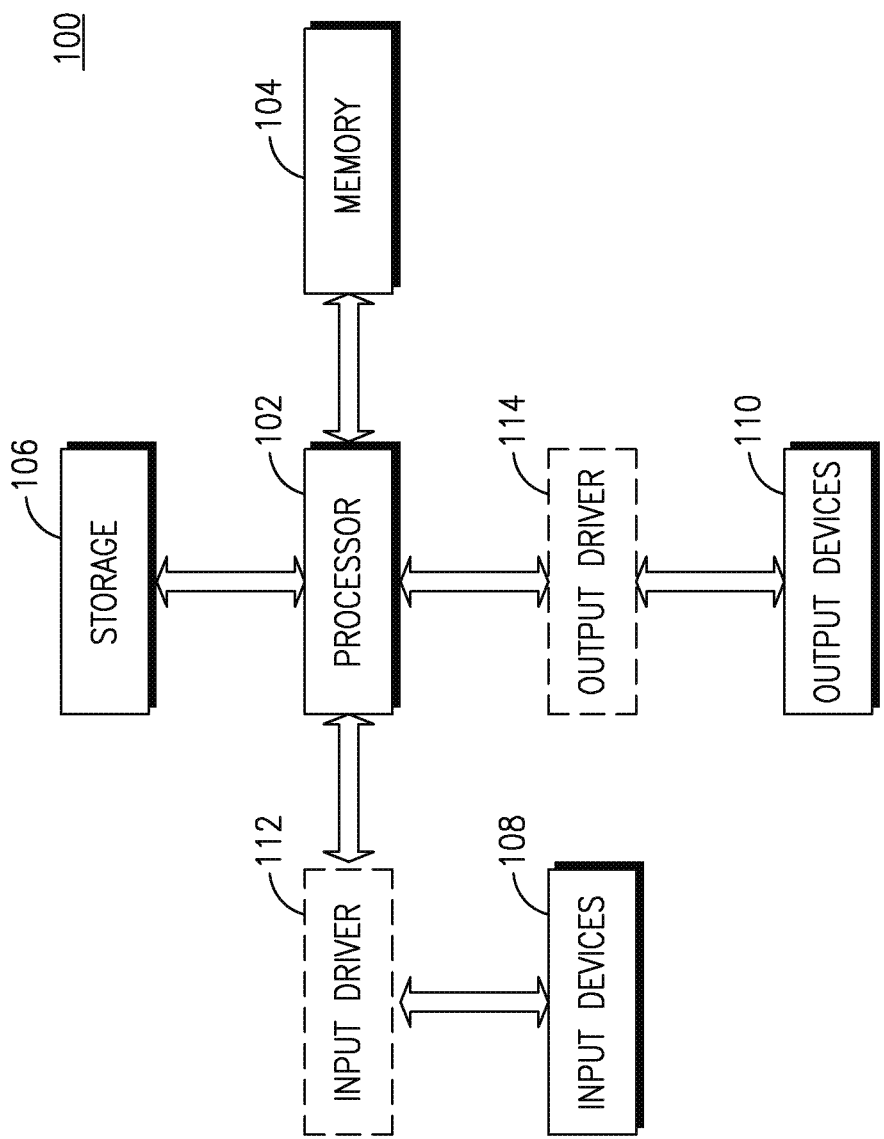
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
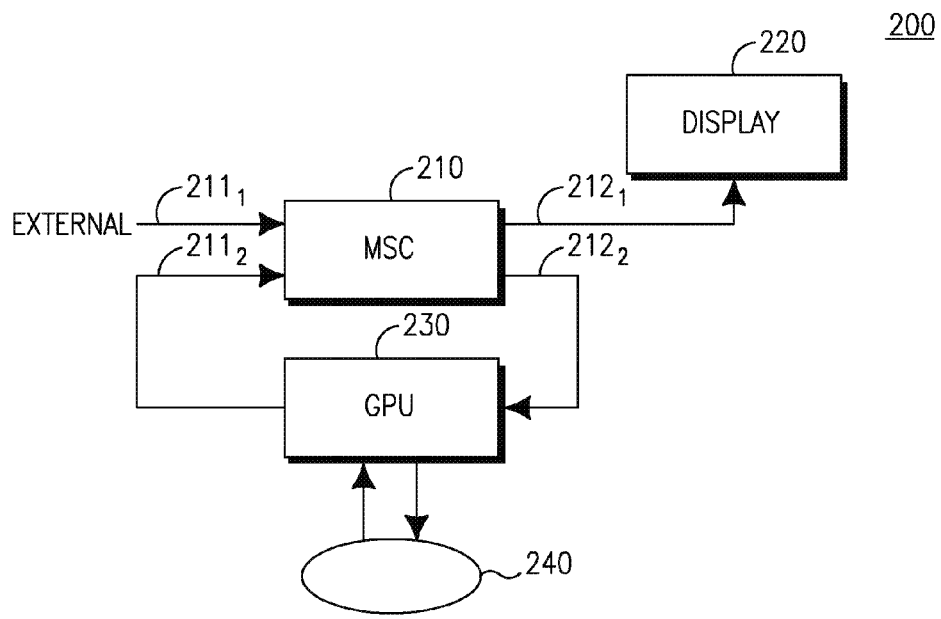
FIG. 2 is a block diagram of an example graphics processing system.

FIG. 2 is a block diagram of an example graphics processing system 200. The system 200 includes a monitor scaler chip (MSC) 210, a display 220 and graphics processing unit (GPU) 230. The MSC 210 includes inputs 211, (designated $211_1$ and $211_2$) and outputs 212, (designated $212_1$ and $212_2$). For purposes of example, only two inputs 211 and two outputs 212 are shown in the MSC 210, it should be understood that any number of inputs and outputs may be included. The MSC 210 receives external inputs via input $211_1$ and an input from the GPU 230 via input $211_2$. The external input $211_1$ may be connected to a DisplayPort, DVI, HDMI, or other capture port that may not support content protection such as HDCP. One output ($212_1$) is connected to the display 220 and the other output ($212_2$) feeds back into the GPU 230. The GPU 230 may be in communication with other parts of a computer system (240) to receive data from, and send data to the system 240, such as to store and extract files. For example, the GPU 230 may be connected to the computer system via a PCIe, or other bus.

Figure 3:
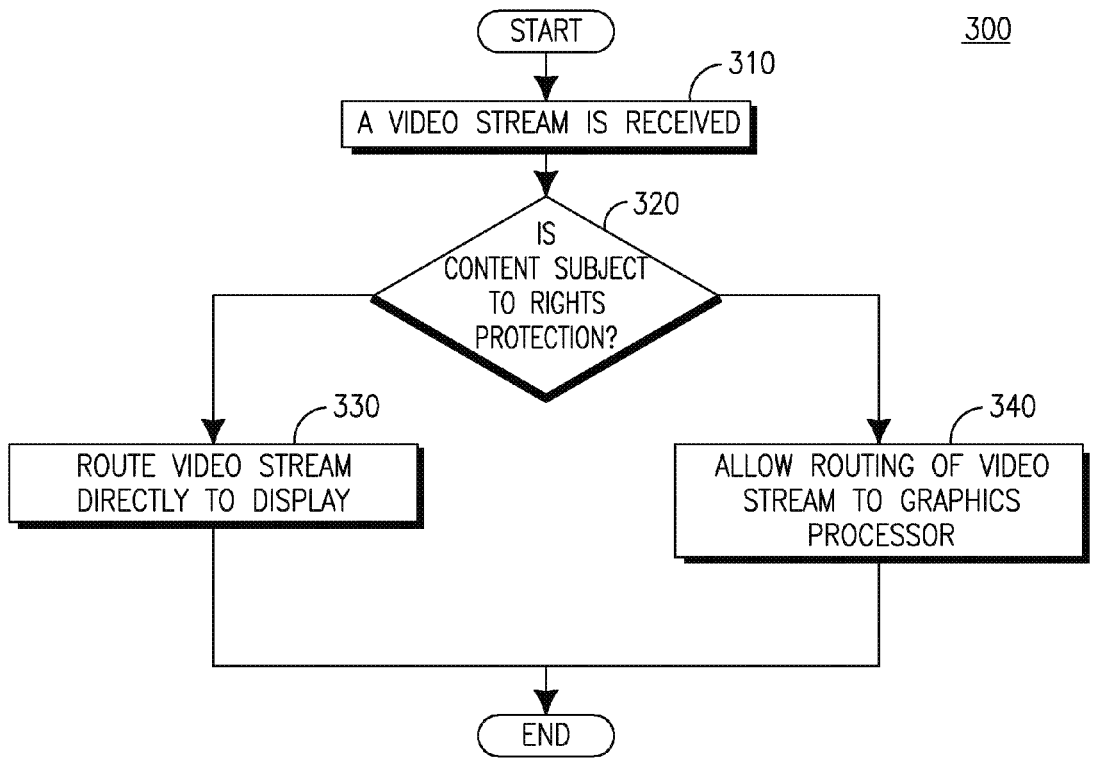
FIG. 3 is a flow diagram of an example method of routing and processing video input data.

FIG. 3 is a flow diagram of an example method 300 of routing and processing video input data. In step 310, a video stream is received. For example, referring back to FIG. 2, the MSC 210 may receive a video stream from the external input $211_1$ or GPU input $211_2$. It is determined in step 320 whether the video stream includes content protection.

If the video stream includes content protection (step 320), then the video stream is routed directly to the display (step 330). For example, if the MSC 210 receives content protected video on its input, (e.g., $211_1$), that content is routed to output $212_1$ for display on the display 220. Additionally, the MSC 210 may perform a scaling function to the video stream, for displaying the video on the display 220 in a format other than fullscreen, such as in a picture-in-picture display format.

If the video stream does not include content protection (step 320), then the video stream may be routed to the graphics processor, (e.g., GPU 230), for video processing (step 340). For example, if the MSC 210 receives a video stream on input $211_1$ that does not include content protection, (e.g., from an HD video camera connected via an HDMI port), the MSC 210 may route the video stream to the GPU 230 via output $212_2$, where the video stream may be further processed, (e.g., captured, stored or recorded).

The MSC 210 may also include an input (not shown) from the computer system via a PCIe, USB, or other bus. Where the video stream content is not protected, the MSC 210 may have an output to transfer the video stream via the PCIe, USB, or other bus. Additionally, where the content is merely displayed on the display 230, the rest of the computer system may not be required to be turned on. That is, the computer may remain in a sleep mode, providing power consumption savings, while the display 230 is activated to display the content routed to it.

It should be understood that many variations are possible based on the disclosure herein. Although features and elements are described above in particular combinations, each feature or element may be used alone without the other features and elements or in various combinations with or without other features and elements.

For example, the MSC may be included in an all-in-one computer system where the display is integral to the system. Alternatively, the display may be an external display that is connected to the computer system via a DVI, HDMI, VGA, or other connection.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for video stream processing, implemented in a monitor scaler chip (MSC), the method comprising:
   receiving the video stream from an external source via a capture port;
   determining whether the video stream includes copy protected content; and
   routing the video stream to either a first location or a second location based upon the external source supporting copy protection and the determination of the presence of copy protected content;
   wherein the video stream is routed directly and exclusively to the first location if the external source supports copy protection and the video stream is determined to include copy protected content;
   wherein the video stream is routed directly and exclusively to the first location if the external source does not support copy protection and the video stream is determined to include copy protected content;
   wherein the video stream is routed to the second location if the external source supports copy protection and the video stream is determined to not include copy protected content;
   wherein the video stream is routed to the second location if the external source does not support copy protection and the video stream is determined to not include copy protected content; and
   wherein the first location is a display and the second location includes a graphics processing unit (GPU).

2. The method of claim 1, wherein the second location further includes storage configured to store the content of the video stream.

3. The method of claim 1, further comprising scaling the video stream prior to routing.

4. A monitor scaler chip (MSC) configured to:
   receive a video stream from an external source via a capture port;
   determine whether the video stream includes copy protected content; and
   route the video stream to either a first location or a second location based upon the external source supporting copy protection and the determination of the presence of copy protected content,
   wherein the video stream is routed directly and exclusively to the first location if the external source supports copy protection and the video stream is determined to include copy protected content;
   wherein the video stream is routed directly and exclusively to the first location if the external source does not support copy protection and the video stream is determined to include copy protected content;
   wherein the video stream is routed to the second location if the external source supports copy protection and the video stream is determined to not include copy protected content;
   wherein the video stream is routed to the second location if the external source does not support copy protection and the video stream is determined to not include copy protected content; and
   wherein the first location is a display and the second location includes a graphics processing unit (GPU).

5. The MSC of claim 4, wherein the second location further includes storage configured to store the content of the video stream.

6. The MSC of claim 4 wherein the MSC is further configured to scale the video stream prior to routing.

7. A computer system, comprising:
- a graphics processing unit (GPU);
- a display; and
- a monitor scaler chip (MSC) in communication with the GPU and the display, the MSC configured to receive a video stream from an external source via a capture port, determine whether the video stream includes copy protected content and route the video stream to either a first location or a second location based upon the external source supporting copy protection and the determination of the presence of copy protected content;
- wherein the MSC is configured to route the video stream directly and exclusively to the first location if the external source supports copy protection and the video stream is determined to contain copy protected content;
- wherein the MSC is configured to route the video stream directly and exclusively to the first location if the external source does not support copy protection and the video stream is determined to contain copy protected content;
- wherein the MSC is configured to route the video stream to the second location if the external source supports copy protection and the video stream is determined to not contain copy protected content;
- wherein the MSC is configured to route the video stream to the second location if the external source does not support copy protection and the video stream is determined to not contain copy protected content; and
- wherein the first location is the display and the second location includes the GPU.

8. The computer system of claim 7 wherein the MSC is further configured to scale the content of the video stream prior to routing the video stream to the display.

9. The computer system of claim 7 wherein the second location further includes storage configured to store the content in the computer system.

10. The computer system of claim 7 wherein the MSC includes a first input and a second input, the first input being an input for the external source via the capture port and the second input being an input from the GPU.

11. The computer system of claim 10 wherein the first input is an input from an HDMI, DVI, DisplayPort, PCIe or USB port.

12. The computer system of claim 11 wherein the MSC further includes a first output and a second output, the first output connected to the display.

13. The computer system of claim 12 wherein the second output is connected to the GPU, PCIe or USB port.

* * * * *